United States Patent
Adhav et al.

(10) Patent No.: US 11,424,991 B2
(45) Date of Patent: Aug. 23, 2022

(54) CHANGE IMPACT SIMULATION ANALYSIS

(71) Applicant: Google LLC, Mountain View, CA (US)

(72) Inventors: Gargi Adhav, San Jose, CA (US); Hui Liu, San Ramon, CA (US); Vishal Gupta, Milpitas, CA (US); Vikas Aggarwal, Brisbane, CA (US); Kan Cai, Mountain View, CA (US); Xiaoyu Zhang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/110,259

(22) Filed: Dec. 2, 2020

(65) Prior Publication Data

US 2022/0150128 A1 May 12, 2022

Related U.S. Application Data

(60) Provisional application No. 63/110,939, filed on Nov. 6, 2020.

(51) Int. Cl.
*H04L 12/00* (2006.01)
*H04L 41/14* (2022.01)
*H04L 41/28* (2022.01)
*H04L 9/40* (2022.01)

(52) U.S. Cl.
CPC ............ *H04L 41/145* (2013.01); *H04L 41/28* (2013.01); *H04L 63/0263* (2013.01); *H04L 63/0272* (2013.01)

(58) Field of Classification Search
CPC ... H04L 41/145; H04L 41/28; H04L 63/0263; H04L 41/0823

USPC ................................................. 709/220, 221
See application file for complete search history.

(56) References Cited

U.S. PATENT DOCUMENTS

| | | | | |
|---|---|---|---|---|
| 5,809,282 A | * | 9/1998 | Cooper | H04L 41/0823 700/49 |
| 2006/0224375 A1 | * | 10/2006 | Barnett | G06F 11/3495 703/22 |
| 2007/0073421 A1 | * | 3/2007 | Adra | G05B 13/041 700/36 |
| 2007/0147246 A1 | * | 6/2007 | Hurley | H04L 43/00 370/232 |

(Continued)

*Primary Examiner* — Frantz Coby
(74) *Attorney, Agent, or Firm* — Homgman LLP; Brett A. Krueger

(57) ABSTRACT

A system for simulating network configurations includes data processing hardware and memory hardware in communication with the data processing hardware. The memory hardware stores instructions that when executed on the data processing hardware cause the data processing hardware to perform operations. The operations includes receiving one or more parameter changes for a production network model of a network. The operations also include generating a simulation network model including the one or more parameter changes. Another operation includes analyzing the simulated network flow within the simulation network model. The operations also include generating a report including an impact of the parameter changes on the network. The operations may also include receiving a production network log including a recorded workflow for the production network model and simulating the production workflow of the production network log within the simulation network model to generate a simulated network log.

27 Claims, 5 Drawing Sheets

(56) References Cited

U.S. PATENT DOCUMENTS

| | | | |
|---|---|---|---|
| 2011/0122776 A1* | 5/2011 | Jacob | H04L 41/22 370/250 |
| 2012/0221305 A1* | 8/2012 | Srivastav | G08G 5/0034 703/6 |
| 2014/0019112 A1* | 1/2014 | Canedo | G06F 30/20 703/21 |
| 2018/0123899 A1* | 5/2018 | Dorr | H04L 51/066 |
| 2018/0123900 A1* | 5/2018 | Dorr | H04L 41/145 |
| 2019/0258753 A1* | 8/2019 | Minwalla | G06F 9/44505 |
| 2021/0306881 A1* | 9/2021 | Ye | H04L 41/145 |

\* cited by examiner

CHANGE IMPACT SIMULATION ANALYSIS

CROSS REFERENCE TO RELATED APPLICATIONS

This U.S. patent application claims priority under 35 U.S.C. § 119(e) to U.S. Provisional Application 63/110,939, filed on Nov. 6, 2020. The disclosures of this prior application is considered part of the disclosure of this application and is hereby incorporated by reference in its entirety.

TECHNICAL FIELD

This disclosure relates to change impact simulation analysis in a cloud network.

BACKGROUND

A virtual private cloud (VPC) is an on-demand configurable pool of shared computing resources allocated within a public cloud environment. The VPC provides isolation for a user from other cloud users. The VPC may execute one or more virtual machines (VMs) which may communication with the user's on-premises network or other remote resources via a virtual private network (VPN). Due to the potential scale and complexity of the VPC, which may include any number of VMs, network gateways, load balancers, etc., significant network configuration is often necessary to operate and maintain the VPC.

SUMMARY

An aspect of the disclosure provides a method of network change simulation. The method includes receiving, at data processing hardware, one or more parameter changes for a production network model of a network. The method also includes generating, by the data processing hardware, a simulation network model including the one or more parameter changes. Additionally, the method includes analyzing, by the data processing hardware, the simulated network flow within the simulation network model, and generating, by the data processing hardware, a report including an impact of the parameter changes on the network.

This aspect of the disclosure may include one or more of the following optional features. In some examples, the method further includes receiving, at the data processing hardware, a production network log including a recorded workflow for the production network model and simulating, by the data processing hardware, the production workflow of the production network log within the simulation network model to generate a simulated network log. In some examples, analyzing the simulated network flow includes comparing, by the data processing hardware, the production network log to the simulation network log, and identifying, by the data processing hardware, differences between the production network log and the simulation network log. Optionally, the production network log is one of a virtual private connection flow log and a firewall rules log.

In some examples, the method may include determining, by the data processing hardware, an impact of the proposed parameter changes on the production network model. Here, the method may include determining the impact of the proposed parameter changes includes an impact to at least one of network reachability, a firewall shadow rules predicted firewall hit rates, user intent rules, security compliance rules, and resource quotas and utilization In some configurations, generating the simulation network model includes incrementally incorporating, by the data processing hardware, the one or more proposed parameter changes into the production network model. In some examples, the method includes receiving, by the data processing hardware, one or more invariant parameters of the production network. The method may further include changing, by the data processing hardware, a configuration of the network when the impact of the parameter changes on the network are acceptable.

Another aspect of the disclosure provides a system. The system includes data processing hardware and memory hardware in communication with the data processing hardware. The memory hardware stores instructions that when executed on the data processing hardware cause the data processing hardware to perform operations. The operations includes receiving one or more parameter changes for a production network model of a network. The operations also include generating a simulation network model including the one or more parameter changes. Another operation includes analyzing the simulated network flow within the simulation network model. The operations also include generating a report including an impact of the parameter changes on the network.

This aspect of the disclosure may include one or more of the following optional features. In one example, the operations include receiving a production network log including a recorded workflow for the production network model. Another operation includes simulating the production workflow of the production network log within the simulation network model to generate a simulated network log. Here, analyzing the simulated network flow may include comparing the production network log to the simulation network log and identifying differences between the production network log and the simulation network log. Optionally, the production network log is one of a virtual private connection flow log and a firewall rules log.

In some configurations, the operations further include determining an impact of the proposed parameter changes on the production network model. Here, determining the impact of the proposed parameter changes includes determining an impact to at least one of network reachability, a firewall shadow rules predicted firewall hit rates, user intent rules, security compliance rules, and resource quotas and utilization.

In some examples, generating the simulation network model includes incrementally incorporating, by the data processing hardware, the one or more proposed parameter changes into the production network model. In some implementations, the operations include receiving, by the data processing hardware, one or more invariant parameters of the production network. In some configurations, the operations include changing a configuration of the network when the impact of the parameter changes on the network are acceptable.

Another aspect of the disclosure provides a computer program product encoded on a non-transitory computer readable storage medium comprising instructions that when executed by a data processing apparatus cause the data processing apparatus to perform operations. The operations includes receiving one or more parameter changes for a production network model of a network. Another operation includes generating a simulation network model including the one or more parameter changes. The operations includes receiving one or more parameter changes for a production network model of a network. The operations also include generating a simulation network model including the one or more parameter changes. Another operation includes analyzing the simulated network flow within the simulation network model. The operations also include generating a report including an impact of the parameter changes on the network.

This aspect of the disclosure may include one or more of the following optional features. In one example, the operations include receiving a production network log including a recorded workflow for the production network model. Another operation includes simulating the production workflow of the production network log within the simulation network model to generate a simulated network log. Here, analyzing the simulated network flow may include comparing the production network log to the simulation network log and identifying differences between the production network log and the simulation network log. Optionally, the production network log is one of a virtual private connection flow log and a firewall rules log.

In some configurations, the operations further include determining an impact of the proposed parameter changes on the production network model. Here, determining the impact of the proposed parameter changes includes determining an impact to at least one of network reachability, a firewall shadow rules predicted firewall hit rates, user intent rules, security compliance rules, and resource quotas and utilization.

In some examples, generating the simulation network model includes incrementally incorporating, by the data processing hardware, the one or more proposed parameter changes into the production network model. In some implementations, the operations include receiving, by the data processing hardware, one or more invariant parameters of the production network. In some configurations, the operations include changing a configuration of the network when the impact of the parameter changes on the network are acceptable.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A virtual private cloud (VPC) is an on-demand configurable pool of shared computing resources allocated within a public cloud environment to provide isolation for a user from other cloud users. This isolation may occur through allocation of private Internet Protocol (IP) subnets and/or virtual communication constructs. The VPC may execute one or more virtual machines (VMs), which may communication with the user's on-premises network or other remote resources via a virtual private network (VPN) to ensure secure access to the VPC environment. Because some VPC environments are very complex with a very large scale (i.e., include a number of VMs, network gateways, load balancers, etc.), significant network configuration is often necessary to operate and maintain the VPC.

Implementations herein are directed toward a network change simulator that allows a user to specify one or more changes to network parameters (e.g., firewall rules, VPC peerings, provisioning or deprovisioning network resources, etc.) and simulate at least one production workflow through the VPC. The network change simulator provides configuration information for each simulated path that includes, for example, route and firewall rules.

Here, the network change simulator builds a simulation network model by incrementally incorporating proposed parameter changes into a production network model of the VPC. The network change simulator then simulates a logged workflow from the VPC within the simulation network model, compares the results of the simulated workflow against the production workflow, and generates an output (e.g., a report) indicating impacts or affects that the proposed configuration, event, and/or network changes will have on the VPC. A user or administrator of the VPC can use the output to decide whether to proceed with incorporating the proposed parameter changes based on an acceptability of the impacts on the VPC.

Figure 1:
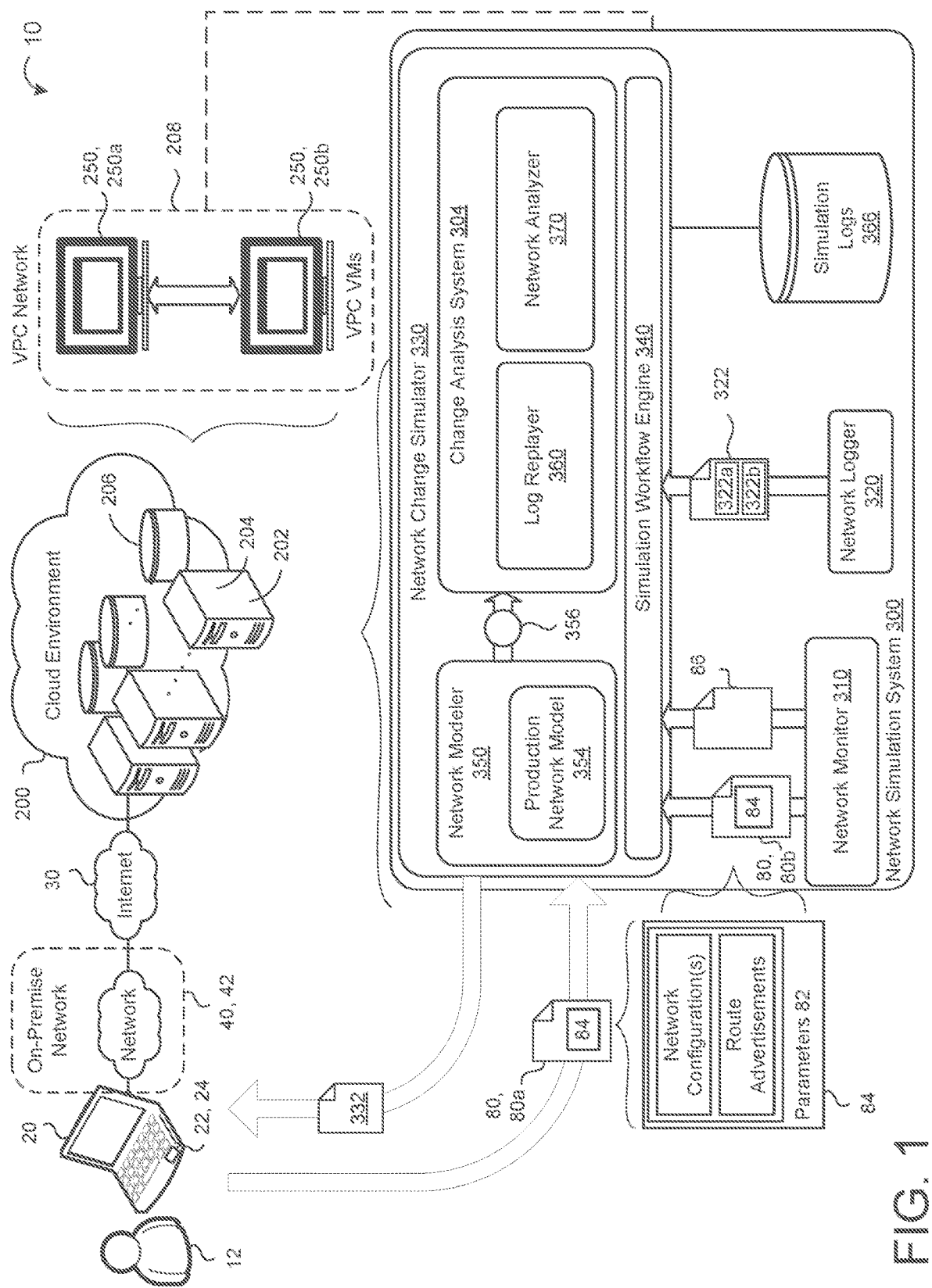
FIG. 1 is a schematic view of an example system for performing change impact simulation analysis in a cloud network.

Referring to FIG. 1, in some implementations, an example system 10 includes a user device 20 associated with a respective user 12 and in communication with a cloud network 200 via a network 30 (e.g., the Internet) and an on-premises network 40 (i.e., the local network that the user device 20 uses to connect to the network 30). The on-premises network 40 includes a network gateway 42 (e.g., a router) that serves as the forwarding host for the on-premises network 40. The user device 20 may correspond to any computing device, such as a desktop workstation, a laptop workstation, or a mobile device (e.g., a smart phone or tablet). The user device 20 includes computing resources 22 (e.g., data processing hardware) and/or storage resources 24 (e.g., memory hardware).

The cloud network 200 may be a single computer, multiple computers, or a distributed system (e.g., a cloud environment) having scalable/elastic resources 202 including computing resources 204 (e.g., data processing hardware) and/or storage resources 206 (e.g., memory hardware). A data store (i.e., a remote storage device) may be overlain on the storage resources 206 to allow scalable use of the storage resources 206 by one or more of the client or computing resources 204. The cloud network 200 is configured to implement and execute one or more virtual machines (VMs) 250, 250a-n. One or more of the VMs execute securely in a virtual private cloud (VPC) environment or VPC 208 associated with or operated by the user 12. The VPC 208 may include a variety of other network elements, such as load balancers, gateways, front ends, and back ends.

Figure 2:
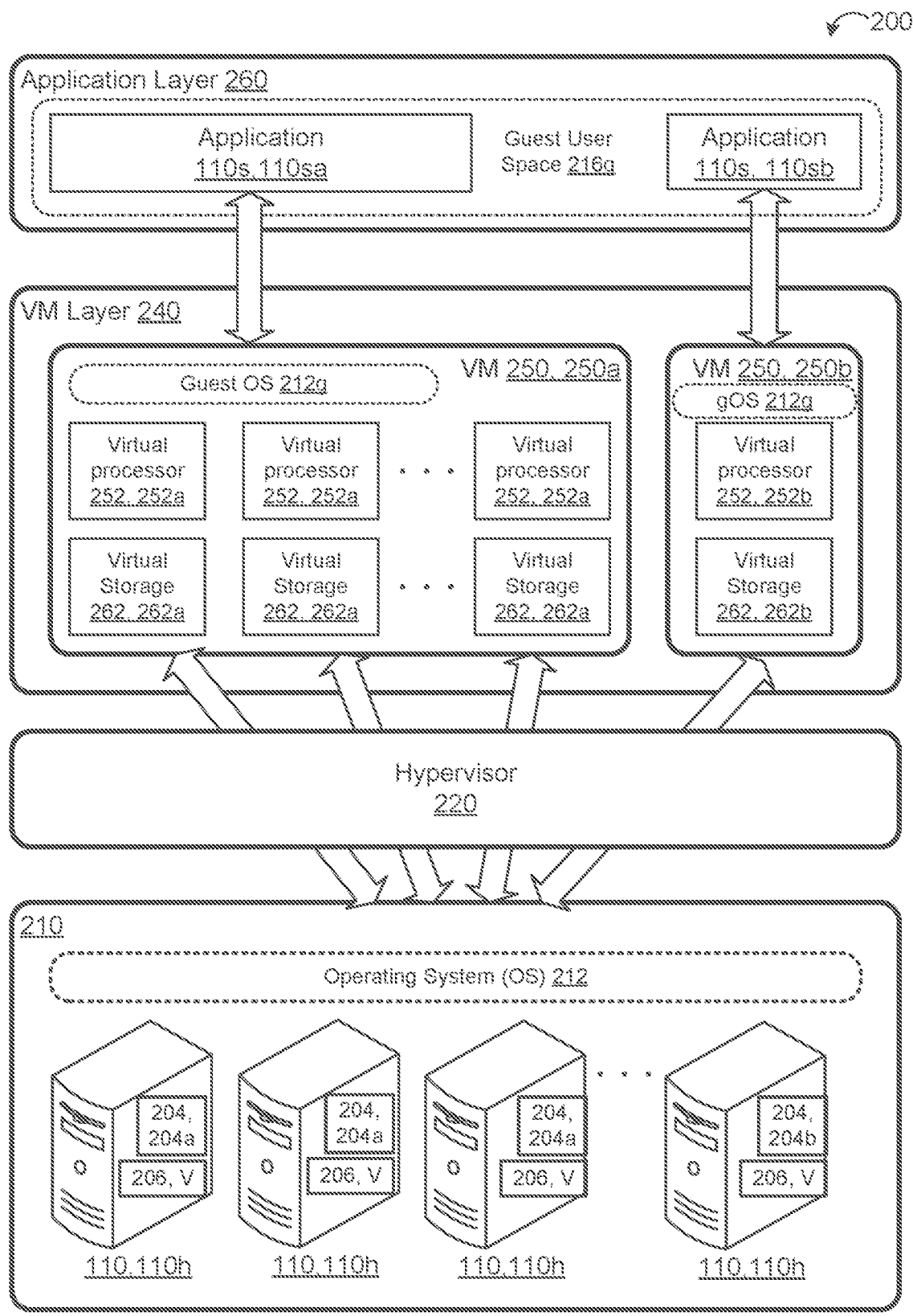
FIG. 2 is a schematic view of example components of a virtual machine of the system of FIG. 1.

In the example shown in FIG. 2, the distributed system 200 includes a collection 210 of resources 110 (e.g., hardware resources 110h), a virtual machine monitor (VMM) 220, a VM layer 240 executing one or more of the VMs 250, and an application layer 260. Each hardware resource 110h may include one or more physical central processing units (pCPU) 204 ("physical processor 204") and memory hardware 206. While each hardware resource 110*h* is shown having a single physical processor 204, any hardware resource 110*h* may include multiple physical processors 204. An operating system 212 may execute on the collection 210 of resources 110.

In some examples, the VMM 220 corresponds to a hypervisor 220 (e.g., a Compute Engine) that includes at least one of software, firmware, or hardware configured to create and execute the VMs 250. A computer (i.e., data processing hardware 204) associated with the VMM 220 that executes the one or more VMs 250 may be referred to as a host machine, while each VM 250 may be referred to as a guest machine. Here, the VMM 220 or hypervisor is configured to provide each VM 250 a corresponding guest operating system (OS) 212*g* having a virtual operating platform and manage execution of the corresponding guest OS 212*g* on the VM 250. As used herein, each VM 250 may be referred to as an "instance" or a "VM instance". In some examples, multiple instances of a variety of operating systems may share virtualized resources. For instance, a first VM 250 of the Linux® operating system, a second VM 250 of the Windows® operating system, and a third VM 250 of the OS X® operating system may all run on a single physical x86 machine.

The VM layer 240 includes one or more virtual machines 250. The distributed system 200 enables the user 12 to launch VMs 250 on demand. A VM 250 emulates a real computer system and operates based on the computer architecture and functions of the real computer system or a hypothetical computer system, which may involve specialized hardware, software, or a combination thereof. In some examples, the distributed system 200 authorizes and authenticates the user 12 before launching the one or more VMs 250. An instance of software, or simply an instance, refers to a VM 250 hosted on (executing on) the data processing hardware 204 of the distributed system 200.

Each VM 250 may include one or more virtual central processing units (vCPUs) 252 ("virtual processor"). In the example shown, a first virtual machine 250*a* includes a first set 252*a* of one or more virtual processors 252 and a second virtual machine 250*b* includes a second set 252*b* of one or more virtual processors 252 While the second set 252*b* is shown as only including one virtual processor 252, any number of virtual processors 252 is possible. Each virtual processor 252 emulates one or more physical processors 204. For example, the first set 252*a* of the one or more virtual processors 252 emulates a first set 204*aa* of one or more physical processors 204, and the second set 252*b* of the one or more virtual processors 252 emulates a second sen 204*b* of one or more physical processors 204 The application layer 260 includes software resources 110*s*.110*sa*, 110*sb* (software applications) that may execute on the virtual machine(s) 250.

Typically, each instance of software (e.g., a virtual machine 250) includes at least one virtual storage device 262 that provides volatile and non-volatile storage capacity for the service on the physical memory hardware 206 For instance, the storage capacity on the physical memory hardware 206 can include persistent disks (PD) that store data for the user 12 across several physical disks (e.g., memory regions 620 (FIG. 9) of the memory hardware 206 or random access memory (RAM) to provide volatile memory. More specifically, each virtual storage device 262 of a corresponding VM 250 moves data in sequences of bytes orbits (blocks) to an associated physical block storage volume V on the memory hardware 206 to provide non-volatile storage. Accordingly, a virtual storage device 262 of a corresponding VM instance 250 provides a storage capacity that maps to corresponding physical block, storage volumes V on the memory hardware 206. In some examples, the virtual storage devices 262 support random access to the data on the memory hardware 206 arid generally use buffered I/O Examples include hard disks. CD-ROM drives, and flash drives. Similarly, portions of volatile memory (e.g., RAM) of physical memory hardware 206 may be divided across the virtual storage devices 262.

Within the guest operating system 212*g* resides a guest kernel 214*g*. A kernel is a computer progrant that is the core of the operating system with full access and control over the OS. That is, the kernel is an intermediary between applications 110*s* and the hardware resources 110*h* of the host machine. Most modern computing systems segregate virtual memory into protected kernel space and user space 216*g*. The kernel typically remains in volatile memory within the protected kernel space and is isolated from user space 216*g*. To increase safety and reliability, applications 110*s* and other software services typically execute in the guest user space 216*g* and lack the privileges necessary to interact with the protected kernel space.

With continued reference to FIG. 1, the cloud network 200 may also execute a VPC intelligence system 300 providing different modules for monitoring arid managing the VPC 206. As generally illustrated in FIG. 1, the network simulation system 300 includes a network monitor 310 configured to monitor the health, security, and operation of the VPC 208, a network logger 320 configured to record traffic flows and firewall events within the VPC 208, and a network change simulator 330 operable to identity the effects of proposed changes 84 to network parameters 82 of the VPC 208. The network change simulator 330 analyzes whether proposed changes 80 to one or more network parameters 82 of the cloud network 200 will affect performance the cloud network 200. Using the analysis, the user 12 can then decide whether to accept, reject, or modify the proposed changes 84 prior to actual implementation into a cloud network 200.

The network monitor 310 may be incorporated within a change analysis system 304 or as a standalone module of the network simulation system 300. The network monitor 310 is operable to evaluate an overall health of the VPC 208. For example, network monitor 310 may conduct configuration checks, identify network failures and broken connections, monitor resource utilization and quotas within the VPC 208, conduct IP address overlap checks within the VPC 208, and/or identify resource capacity reduction due to less than optimal network health. The network monitor 310 may also monitor firewall rules and firewall hits of the VPC 208 to identify potential issues with the security of the VPC 208. The network monitor 310 may also be configured to monitor the VPC 208 to identify whether elements of the VPC 208, such as subnets, firewalls, and load balancers, are being underutilized. When included, the network monitor 310 may be configured to generate automated change requests 80*b* including recommendations for parameter changes 84 based on the monitoring of the VPC 208.

The network change simulator 330 receives or obtains a change request 80, 80*a*, 80*b* including proposed changes 84 to network parameters 82 of the cloud network 200. Examples of network parameters 82 that may be changed include (i) adding or deleting firewall rules, (ii) adding or deleting VPC peerings, (iii) adding or deleting IP address blocks, VMs 250, subnets, and/or load balancers, and/or (iv) adding or reducing VPN tunnels, BB masks, Zakim endpoints, and the like. The network change simulator 330 may receive or obtain a change request 80, 80a including parameter changes 84 directly from the user 12 via the user device 20. Additionally or alternatively, the network change simulator 330 may receive or obtain a change request 80, 80b including parameter changes 84 recommended by the network monitor 310 of the network simulation system 300. In addition to the change request 80, the network change simulator 330 also receives or extracts one or more invariant parameters 86 from the network monitor 310. The invariant parameters 86 may include security compliance rules specified by an administrator or service provider of the cloud network 200, or by the user 12. The invariant parameters 86 include network parameters that cannot be modified via the change request 80.

In addition to obtaining the change request 80 and the invariant parameters 86, the network change simulator 330 also retrieves one or more network logs 322 associated with a current or prior configuration of the cloud network 200, which may be referred to as a production configuration. The network logs 322 may include VPC flow logs 322, 322a and/or firewall logs 322, 322b. The VPC flow logs 322a include recordings of sample network flows sent from and received by each VM 250, while the firewall logs 322b include connection records corresponding to each instance of a particular firewall rule allowing or denying traffic. The connection records of the firewall logs 322b contain source and destination IP addresses, protocols and ports, date and time, and a reference to the particulate firewall rule that applied to the allowed or denied traffic.

The network change simulator 330 includes a simulation workflow engine 340 that monitors and manages the activities of the network change simulator 330. The simulation workflow engine 340 sends and receives simulation information within the network simulation system 300 and the cloud environment 200. The simulation workflow engine 340 also assigns simulation tasks toother modules 350, 360, 370 of the network change simulator 330, as discussed in the following paragraphs. For example, the simulation workflow engine 340 may receive a change request 80 from the user device 20 or the network monitor 310 and then manage operations within the network change simulator 330 to determine and report the potential effects of the change request 80.

One of the modules 350 of the network change simulator 330 includes a network modeler 350 operable to generate a simulation network model 356 based on one of the changes requests 80. The network modeler 350 begins with production network model 354 representing a current production configuration of the VPC 208. The network modeler 350 then generates a simulation network model 356 by incrementally incorporating the parameter changes 84 specified in the change request 80. Accordingly, the simulation network model 356 includes one or more graphs of the VPC 208 with the parameter changes 84 incorporated.

Another module of the network change simulator 330 includes a log replayer 360 that executes a simulated network flow within the simulation network model 356 by replaying one of the network logs 322 obtained from the network logger 320. As a reminder, the logs 322 obtained from the network logger include VPC logs 322a and firewall rules logs 322b generated by the network intelligence system 270 for the production configuration of the cloud network 200 Accordingly, the model log replayer 360 uses the VPC logs 322a and the firewall rules logs 322b to simulate workflows that would occur within the cloud network 200 based on the simulation network model 356.

The log replayer 360 analyzes the simulation network model 356 when executing the sample workflows provided in the network logs 322 to determine an impact that the changes 84 will have on performance metrics of the VPC 208. The log replayer 360 analyzes and reports a number of performance metrics associated with the simulation network model 356. For example, the log replayer 360 analyzes an impact that the parameter changes 84 will have on reachability within the VPC 208. Here, the log replayer 360 identifies whether the changes are opening reachability between IP ranges and/or VMs 250 that was previously blocked or, alternatively, breaking reachability between IP ranges and/or VMs 250 that was previously open. The log replayer 360 may interpret the impact on reachability based on a reachability intent designated by the user.

The log replayer 360 also analyzes and reports the impact that the parameter changes 84 have on firewall rules relationships. For example, the log replayer 360 analyzes whether the parameter changes 84 result in additional or eliminated firewall shadowing. The log replayer 360 also identifies whether changes occur to firewall optimality and/ or firewall security boundaries. For firewall optimality, the log replayer 360 analyzes and reports whether the simulation network model 356 includes additional firewall shadow relationships, which result in firewalls of the VPC 208 being more verbose and less optimal, or whether firewall shadow relationships have been eliminated, thereby making the firewalls more optimal. With respect to firewall security boundaries, the log replayer 360 analyzes and reports whether the parameter changes 84 result in the security boundaries being opened or tightened. The log replayer 360 may also analyze and report a predicted firewall hit rate for the simulation network model 356.

The log replayer 360 may also analyze whether the simulation network model 356 has an impact on a network intent designated by the user 12. For example, the user 12 may initially designate that the intent of VPC 208 is to conduct or support a specific business function (e.g., configuring cellular networks, managing product logistics). Here, the network evaluator 360 analyzes whether the changes 84 incorporated in the simulation network model 356 will adhere to or violate the intent rules of the VPC 208. Similarly, the log replayer 360 analyzes and reports whether the simulation network model 356 has an impact on network compliance rules for the VPC 208. The log replayer 360 stores results of the simulated workflow on the simulation network model 356 as simulation logs 366.

The log replayer 360 records the results of replaying the production logs 322 within the simulation network model 356 as simulation logs 366 and stores the simulation logs 366 on the change analysis system 304. The simulation workflow engine 340 then compares the simulation logs 366 against the corresponding production logs 322 to identify differences between the production network model 354 (i.e., the current VPC network 208) and the simulation network model 356 (i.e., the VPC network 208 including the parameter changes 84).

In addition to the log replayer 360, which executes a dynamic analysis of the simulation network model 356 using the sample workflows provided in the network logs 322, the change analysis system 304 of the network change simulator 330 may also include a network analyzer 370 that executes static analysis of the simulation network model 356. Here, the network analyzer 370 is configured to execute validation tests on the simulation network model 356 to identify potential issues with the proposed parameter changes 84. For example, the network analyzer 370 may execute a comparison (e.g., static analysis, config checks using invariances, etc.) of the parameter changes 84 against the production network parameters 82 to highlight differences between the production network model 354 and the simulation network model 356. In some examples, the network monitor 310 and the network analyzer 370 are integrated within the same modules to execute both monitoring and analysis functions.

The network analyzer 370 may be operable to evaluate an overall health of the network simulation model 356. For example, network analyzer 370 may conduct configuration checks, identify unused routes and broken connections, monitor resource utilization and quotas within the network simulation model 356, conduct IP address overlap checks within the network simulation model 356, and/or identify resource capacity reduction due to less than optimal network health. The network analyzer 370 may also analyze firewall rules and firewall hits of the network simulation model 356 to identify potential issues with the security of the network simulation model 356. Additionally or alternatively, the network analyzer 370 may analyze the simulation network model 356 to identify whether elements of the network simulation model 356, such as subnets, firewalls, and load balancers, are overlapping and/or underutilized.

Figure 3:
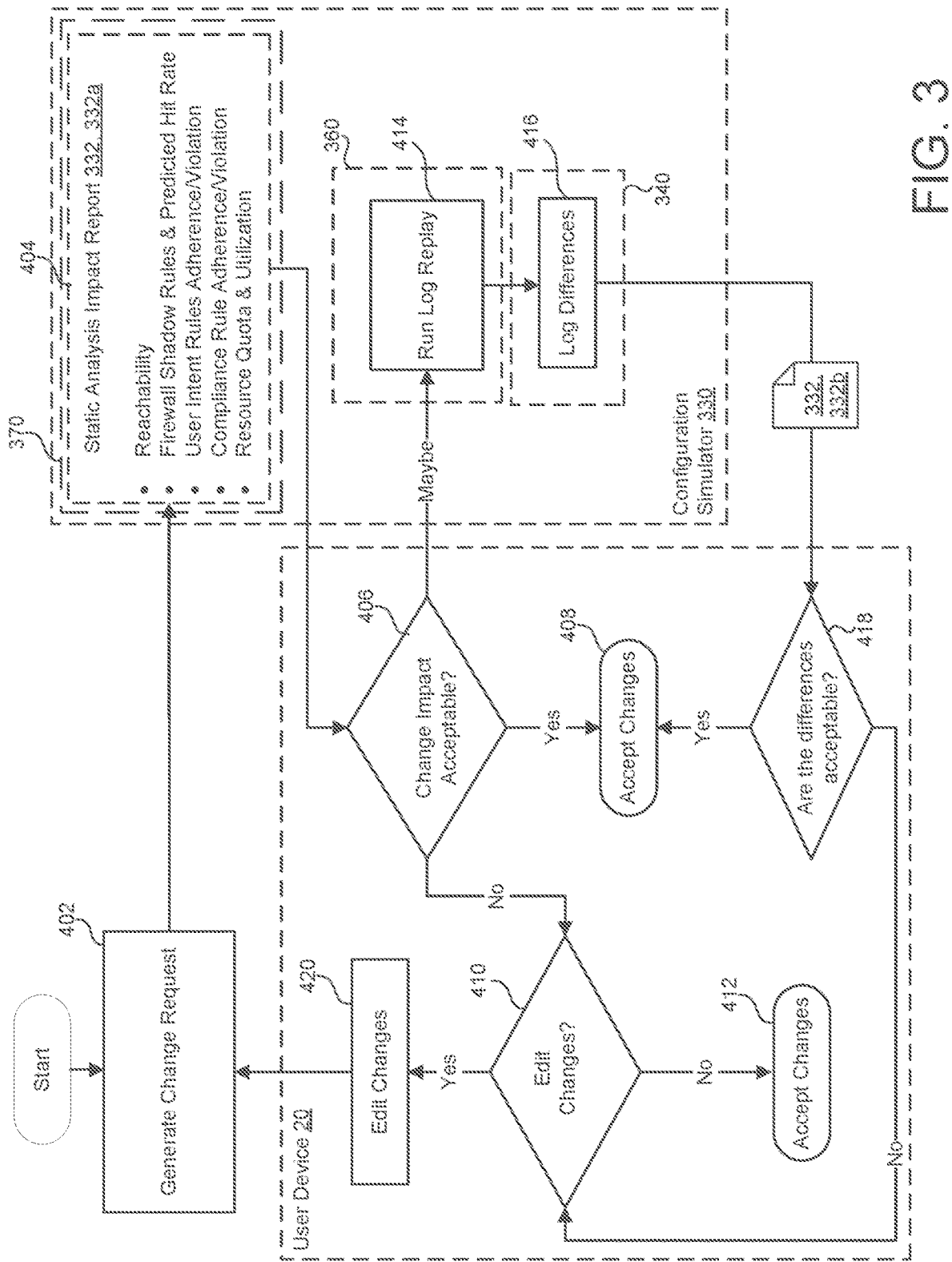
FIG. 3 is a flowchart of an example workflow for using the network change simulator of the system of FIG. 1.

Based on the results of the dynamic analysis at the log replayer 360 and/or the static analysts at the network analyzer 370, network change simulator 330 may generate a change impact report 332, and presents the change impact report 332 to the user 12 via the user device 20. The change impact report 332 identifies impacts to network reachability, firewalls, user intent rules, security compliance rules, and resource quotas and utilization for the VPC 208 if the parameter changes 84 are implemented. The change impact report 332, when received by the user device 20, causes the user device 20 to present the change impact report 332 to the user 12 for evaluation as to whether the pending parameter changes 84 should be accepted, rejected, or modified. As shown in FIG. 3 and described later, the user 12 may use the change impact report 332 to decide whether to accept, reject, or edit the parameter changes 84.

Referring now to FIG. 3, an example workflow 400 is provided for a user 12 interfacing with the network change simulator 330 via the user device 20. At block 402, the user 12 or the network monitor 310 generates a change request 80 including parameter changes 84. At block 404, the network analyzer 370 analyzes the parameter changes 84 and generates a static analysis impact report 332, 332a identifying the effect(s) that the parameter changes 84 will have on the VPC network 208. The static analysis impact report 332a may identify the impact to network reachability, firewall shadow rules and predicted hit rates, user intent rules, security compliance rules, and resource quotas and utilization.

The network change simulator 330 provides the static analysis impact report 332a to the user device 20 where, at decision block 406, the user 12 provides an instruction as to whether the impact of the pending parameter change 84 is acceptable to the user 12. Where the static analysis impact report 332a indicates that the parameter changes 84 will have no impact or a minimal impact on the VPC 208, the user 12 may decide that the pending parameter change 84 is acceptable and proceeds to block 408 to accept the pending parameter changes 84. Conversely, static analysis impact report 332a may clearly indicate that the parameter changes 84 will result in a failure of the VPC 208. Here, the user 12 may respond that the pending parameter change 84 is unacceptable and proceed to decision block 410 to decide whether or not the parameter change 84 should be edited. If the user 12 decides not to edit the parameter changes 84, the workflow proceeds to block 412 and the parameter changes are rejected 84.

When the impact of the parameter changes 84 are not clearly acceptable or unacceptable at decision block 406, the user 12 may instruct the network change simulator 330 execute a log replay at block 414. As provided above, the log replay 414 is conducted on the log replayer 360 by replaying a production log 322 within the simulation network model 356 to generate the simulation logs 366. The workflow then advances to block 416 where the simulation logs 366 are compared to the production logs 322 to identify differences between the production network model 354 (i.e., current VPC 208) and the simulation network model 356 (i.e., proposed VPC 208). The network change simulator 330 then generates a dynamic analysis impact report 332b detailing differences between the production network model 354 and the simulation network model 356 based on the differences between the production logs 322 and the simulation logs 366.

At decision block 418, the user 12 reviews the dynamic analysis impact report 332b to determine whether the differences between the production network model 354 and the simulation network model 356. If the differences are acceptable, the workflow advances to block 408 and the parameter changes 84 are incorporated 408 into the VPC 208. If the differences are not acceptable the workflow proceeds to decision block 410, where the user 12 decides whether or not to edit the parameter changes 84. If the user 12 does not want to edit the parameter changes 84 (i.e., answer is "no" at block 410) then the parameter changes are rejected at block 412. However, if the user 12 decides to edit the parameter changes 84, then the workflow proceeds to block 420 where the user 12 can modify one or more of the parameter changes 84. When parameter changes 84 are edited at block 420, the workflow returns to block 402 and initiates another change request 80 including the edited parameter changes 84. Thus, the workflow 400 repeats until parameter changes 84 are either accepted at block 408 or rejected at block 412, thereby allowing the user 12 to iteratively modify, simulate, and review parameter changes 84 to the VPC 208 without disrupting the production VPC 208.

Figure 4:
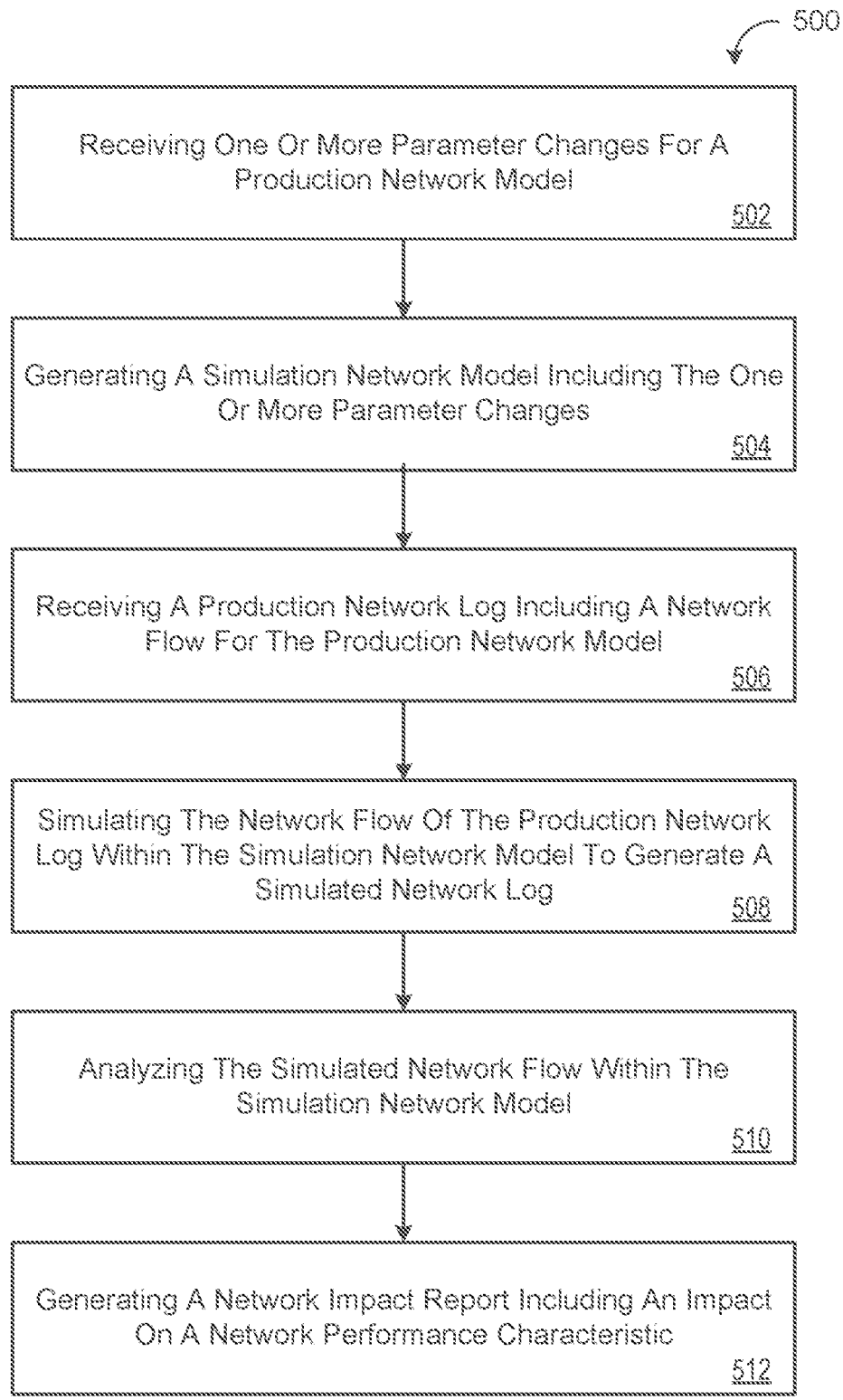
FIG. 4 is a flowchart of an example arrangement of operations for a method of performing change impact simulation analysis.

FIG. 4 is a flowchart of an exemplary arrangement of operations for a method 500 of performing change impact simulation analysis. The method 500 includes, at operation 502, receiving, at data processing hardware 204, one or more parameter changes 84 for a production network model 354 of a network 208. At operation 504, the method 500 includes generating, by the data processing hardware 204, a simulation network model 356 including the one or more parameter changes 84. The method 500, at operation 506, includes receiving, at the data processing hardware 204, a production network log 322 for the production network model 354. At operation 508, the method 500 includes simulating, by the data processing hardware 204, execution of the production network log 322 within the simulation network model 356 to generate a simulated network log 366. The method 500 further includes, at operation 510, analyzing, by the data processing hardware 204, the simulated network log 366 and at operation 512, generating, by the data processing hardware, a network impact report 332 including an impact of the parameter changes 84 on the network 208.

Figure 5:
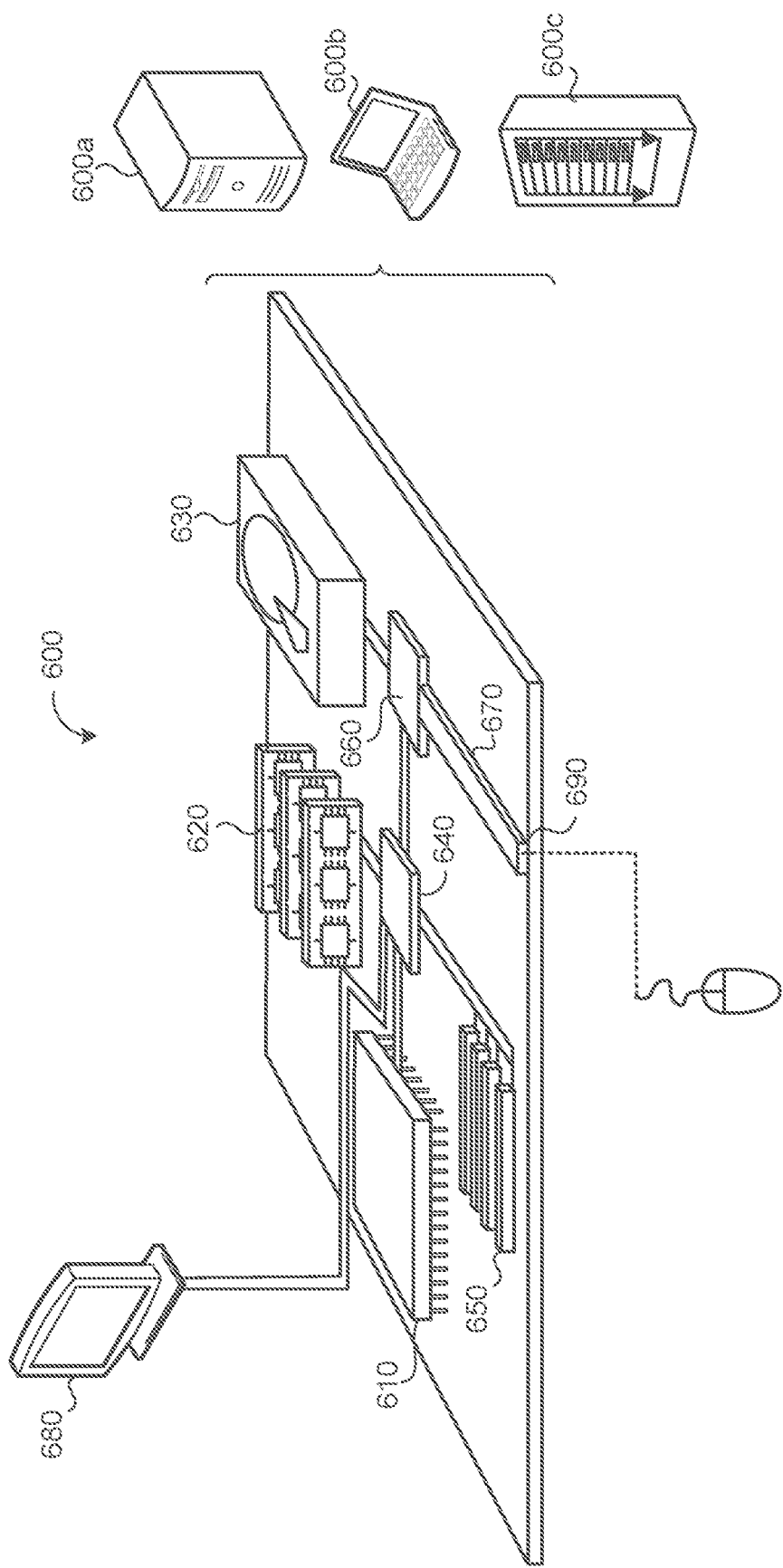
FIG. 5 is a schematic view of an example computing device that may be used to implement the systems and methods described herein.

FIG. 5 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620,630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e g, USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks, magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of network configuration simulation, the method comprising:
   receiving, at data processing hardware, one or more parameter changes for a production network model of a network;
   generating, by the data processing hardware, a simulation network model based on a production network log comprising a recorded workflow for the production network model, the simulation network model including the one or more parameter changes;
   analyzing, by the data processing hardware, a simulated network flow within the simulation network model;
   generating, by the data processing hardware, a report including an impact of the one or more parameter changes on the network, the report indicating differences between the production network model and the simulation network model;
   in response to generating the report, receiving, at the data processing hardware, an acceptance of the one or more parameter changes; and
   in response to receiving the acceptance of the one or more parameter changes, implementing, by the data processing hardware, the one or more parameter changes in the network.

2. The method of claim 1, further comprising:
   receiving, at the data processing hardware, the production network log including the recorded workflow for the production network model; and
   simulating, by the data processing hardware, the recorded workflow of the production network model within the simulation network model to generate a simulation network log.

3. The method of claim 2, wherein analyzing the simulated network flow comprises:
   comparing, by the data processing hardware, the production network log to the simulation network log; and
   identifying, by the data processing hardware, differences between the production network log and the simulation network log.

4. The method of claim 2, wherein the production network log is one of a virtual private connection flow log and a firewall rules log.

5. The method of claim 1, further comprising determining, by the data processing hardware, an impact of the one or more parameter changes on the production network model.

6. The method of claim 5, wherein determining the impact of the one or more parameter changes on the production network model comprises determining an impact to at least one of network reachability, a firewall shadow rules predicted firewall hit rates, user intent rules, security compliance rules, and resource quotas and utilization.

7. The method of claim 1, wherein generating the simulation network model includes incrementally incorporating, by the data processing hardware, the one or more parameter changes into the production network model.

8. The method of claim 1, further comprising receiving, by the data processing hardware, one or more invariant parameters of the production network model.

9. The method of claim 1, further comprising changing, by the data processing hardware, a configuration of the network when the impact of the one or more parameter changes on the network are acceptable.

10. A system comprising:
    data processing hardware; and
    memory hardware in communication with the data processing hardware, the memory hardware storing instructions that when executed on the data processing hardware cause the data processing hardware to perform operations comprising:
    receiving one or more parameter changes for a production network model of a network;
    generating a simulation network model based on a production network log comprising a recorded workflow for the production network model, the simulation network model including the one or more parameter changes;
    analyzing a simulated network flow within the simulation network model;
    generating a report including an impact of the one or more parameter changes on the network, the report indicating differences between the production network model and the simulation network model;
    in response to generating the report, receiving an acceptance of the one or more parameter changes; and
    in response to receiving the acceptance of the one or more parameter changes, implementing the one or more parameter changes in the network.

11. The system of claim 10, wherein the operations further comprise:
    receiving the production network log including the recorded workflow for the production network model; and simulating the recorded workflow of the production network model within the simulation network model to generate a simulation network log.

12. The system of claim 11, wherein analyzing the simulated network flow comprises:
comparing the production network log to the simulation network log; and
identifying differences between the production network log and the simulation network log.

13. The system of claim 11, wherein the production network log is one of a virtual private connection flow log and a firewall rules log.

14. The system of claim 10, wherein the operations further comprise determining an impact of the one or more parameter changes on the production network model.

15. The system of claim 14, wherein determining the impact of the one or more parameter changes one the production network model comprises determining an impact to at least one of network reachability, a firewall shadow rules predicted firewall hit rates, user intent rules, security compliance rules, and resource quotas and utilization.

16. The system of claim 10, wherein generating the simulation network model includes incrementally incorporating the one or more parameter changes into the production network model.

17. The system of claim 10, wherein the operations further comprise receiving one or more invariant parameters of the production network model.

18. The system of claim 10, wherein the operations further comprise changing a configuration of the network when the impact of the one or more parameter changes on the network are acceptable.

19. A computer program product encoded on a non-transitory computer readable storage medium comprising instructions that when executed by a data processing apparatus cause the data processing apparatus to perform operations comprising:
receiving one or more parameter changes for a production network model of a network;
generating a simulation network model based on a production network log comprising a recorded workflow for the production network model, the simulation network model including the one or more parameter changes;
analyzing a simulated network flow within the simulation network model;
generating a report including an impact of the one or more parameter changes on the network, the report indicating differences between the production network model and the simulation network model;
in response to the report, receiving an acceptance of the one or more parameter changes; and
in response to the acceptance of the one or more parameter changes, implementing the one or more parameter changes in the network.

20. The computer program product of claim 19, wherein the operations further comprise:
receiving the production network log including the recorded workflow for the production network model; and
simulating the recorded workflow of the production network model within the simulation network model to generate a simulation network log.

21. The computer program product of claim 20, wherein analyzing the simulated network flow comprises:
comparing the production network log to the simulation network log; and
identifying differences between the production network log and the simulation network log.

22. The computer program product of claim 20 wherein the production network log is one of a virtual private connection flow log and a firewall rules log.

23. The computer program product of claim 19, wherein the operations further comprise determining an impact of the one or more parameter changes on the production network model.

24. The computer program product of claim 23, wherein determining the impact of the one or more parameter changes on the production network model comprises determining an impact to at least one of network reachability, a firewall shadow rules predicted firewall hit rates, user intent rules, security compliance rules, and resource quotas and utilization.

25. The computer program product of claim 19, wherein generating the simulation network model includes incrementally incorporating the one or more parameter changes into the production network model.

26. The computer program product of claim 19, wherein the operations further comprise receiving one or more invariant parameters of the production network model.

27. The computer program product of claim 19, wherein the operations further comprise changing a configuration of the network when the impact of the one or more parameter changes on the network are acceptable.

* * * * *